US010009288B2

(12) United States Patent
Blinn et al.

(10) Patent No.: US 10,009,288 B2
(45) Date of Patent: Jun. 26, 2018

(54) REGISTRANT DEFINED PREREQUISITES FOR REGISTERING A TERTIARY DOMAIN

(71) Applicant: GO DADDY OPERATING COMPANY, LLC, Scottsdale, AZ (US)

(72) Inventors: Arnold Blinn, Hunts Point, WA (US); Andrew Low Ah Kee, Menlo Park, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 242 days.

(21) Appl. No.: 14/984,170

(22) Filed: Dec. 30, 2015

(65) Prior Publication Data

US 2017/0195249 A1 Jul. 6, 2017

(51) Int. Cl.
*G06F 15/173* (2006.01)
*H04L 12/927* (2013.01)
*H04L 29/12* (2006.01)
*H04L 29/08* (2006.01)
*G06F 17/30* (2006.01)

(52) U.S. Cl.
CPC ........ *H04L 47/80* (2013.01); *G06F 17/30377* (2013.01); *G06F 17/30477* (2013.01); *G06F 17/30554* (2013.01); *H04L 61/1511* (2013.01); *H04L 61/2076* (2013.01); *H04L 61/302* (2013.01); *H04L 67/02* (2013.01); *H04L 61/6068* (2013.01)

(58) Field of Classification Search
None
See application file for complete search history.

(56) References Cited

U.S. PATENT DOCUMENTS

| 8,037,168 B2 | 10/2011 | Schneider | |
|---|---|---|---|
| 8,732,189 B2 | 5/2014 | Fujita et al. | |
| 9,053,302 B2 | 6/2015 | Sastry et al. | |
| 2004/0199493 A1* | 10/2004 | Ruiz | G06Q 30/06 |
| 2006/0095788 A1* | 5/2006 | Bronstein | G06F 21/42 |
| | | | 713/185 |
| 2008/0201487 A1* | 8/2008 | Blinn | H04L 29/12066 |
| | | | 709/245 |
| 2008/0228675 A1* | 9/2008 | Duffy | G06F 17/278 |
| | | | 706/10 |
| 2010/0036725 A1 | 2/2010 | Turakhia | |
| 2011/0313876 A1* | 12/2011 | Shuster | G06Q 30/0601 |
| | | | 705/26.1 |
| 2013/0067115 A1* | 3/2013 | Lapanc | H04L 67/025 |
| | | | 709/245 |
| 2016/0065533 A1* | 3/2016 | Schilling | H04L 61/302 |
| | | | 709/221 |
| 2017/0221061 A1* | 8/2017 | Orttung | G06Q 20/405 |

* cited by examiner

*Primary Examiner* — Joshua Joo
(74) *Attorney, Agent, or Firm* — Quarles & Brady, LLP

(57) ABSTRACT

Systems and methods of the present invention provide for one or more server computers communicatively coupled to a network and configured to: receive, from a sub domain registration settings control panel displayed on a client computer, rule or prerequisites required for a sub domain registrant to register a sub domain, and store these rules or prerequisites in a database. The server(s) may then receive: a sub domain registration request, an IP address directing HTTP requests to the sub domain; and an authentication verifying that the prerequisite has been fulfilled. If authenticated, the server(s) may automatically insert the IP address into an A record or NS record in a zone file for the domain.

15 Claims, 10 Drawing Sheets

File  Edit  Tools

Domain Name Control Panel

Search a Domain Name:

Please enter the domain name you would like to register: | flagstaff.com | | Search | flagstaff.com is available! Please provide the following WHOIS information and click submit. Please note that the price to register flagstaff.com is currently $9.99 per year. This price includes fees for the .com registry.

Name: | John Doe |

Email address: | john@flagstaff.gov |

Submit flagstaff.com successfully registered!

FIG. 2

File  Edit  Tools

Sub Domain Registration Control Panel - flagstaff.com

Search a Domain Name:
Please enter the domain name you would like to register: | flagstaff.com | Search joespizza.flagstaff.com is available! Please provide the following DNS information (which will create the zone file shown to the right) and click submit.

Username: | username

IP address: | 192.0.2.1

Email IP address: | 192.0.2.3

Submit joespizza.flagstaff.com successfully registered!

```
$ORIGIN joespizza.flagstaff.com.
$TTL 1h
joespizza.flagstaff.com.   IN
SOA ns.joespizza.com.
username.joespizza.flagstaff.com.
(2007120710 1d 2h 4w 1h)
IN   A      192.0.2.1
IN   AAAA   2001:db8:10::1
www IN  CNAME
joespizza.flagstaff.com.
wwwtest IN  CNAME www
mail   IN  A   192.0.2.3
mail2  IN  A   192.0.2.4
mail3  IN  A   192.0.2.5
```

FIG. 9

REGISTRANT DEFINED PREREQUISITES FOR REGISTERING A TERTIARY DOMAIN

FIELD OF THE INVENTION

The present invention generally relates to the field of Domain Name registration and specifically to: registering a tertiary domain of an associated domain name via an automated registrar framework; sharing, with a registrant of the domain name, revenue received from the tertiary domain registration; defining, according to registrant input, prerequisites for registering the tertiary domain; and defining, according to registrant input, tertiary domain control panel and update features available to the sub domain registrant.

SUMMARY OF THE INVENTION

The present invention provides systems and methods comprising one or more server computers communicatively coupled to a network and including instructions, that when executed by a processor running on the one or more server computers, cause the one or more server computers to: receive, from a sub domain registration settings control panel displayed on a client computer, a profit to be paid to a registrant if a sub domain associated with the domain name is registered, and store the profit to be paid in a database. The server(s) may also render a sub domain registration control panel and receive: a sub domain registration request; and an IP address directing HTTP requests to the sub domain and automatically insert the IP address into an A record or NS record in a zone file for the domain. The server(s) may then select the profit to be paid from the database and update a registrant user profile to include the profit to be paid.

In another embodiment, the present invention provides systems and methods comprising one or more server computers communicatively coupled to a network and including instructions, that when executed by a processor running on the one or more server computers, cause the one or more server computers to: receive, from a sub domain registration settings control panel displayed on a client computer, rule or prerequisites required for a sub domain registrant to register a sub domain, and store these rules or prerequisites in a database. The server(s) may then receive: a sub domain registration request; an IP address directing HTTP requests to the sub domain; and an authentication verifying that the prerequisite has been fulfilled. If authenticated, the server(s) may automatically insert the IP address into an A record or NS record in a zone file for the domain.

In another embodiment, the present invention provides systems and methods comprising one or more server computers communicatively coupled to a network and including instructions, that when executed by a processor running on the one or more server computers, cause the one or more server computers to: receive, from a sub domain registration settings control panel displayed on a client computer, form elements to be displayed on a sub domain settings control panel, and store these form elements in a database. The server(s) may then display an HTML form on the sub domain settings control panel, where each HTML for element corresponds to a database record defining features for updating an email, tertiary domain or record modification to a zone file for a registered sub domain.

The above features and advantages of the present invention will be better understood from the following detailed description taken in conjunction with the accompanying drawings.

BRIEF DESCRIPTION OF THE DRAWINGS

FIG. 2 is an example embodiment including a user interface used in registering a domain name.

FIG. 9 is a example embodiment including a user interface used in registering a tertiary domain name with revenue sharing and registrant controls.

DETAILED DESCRIPTION

Figure 1:
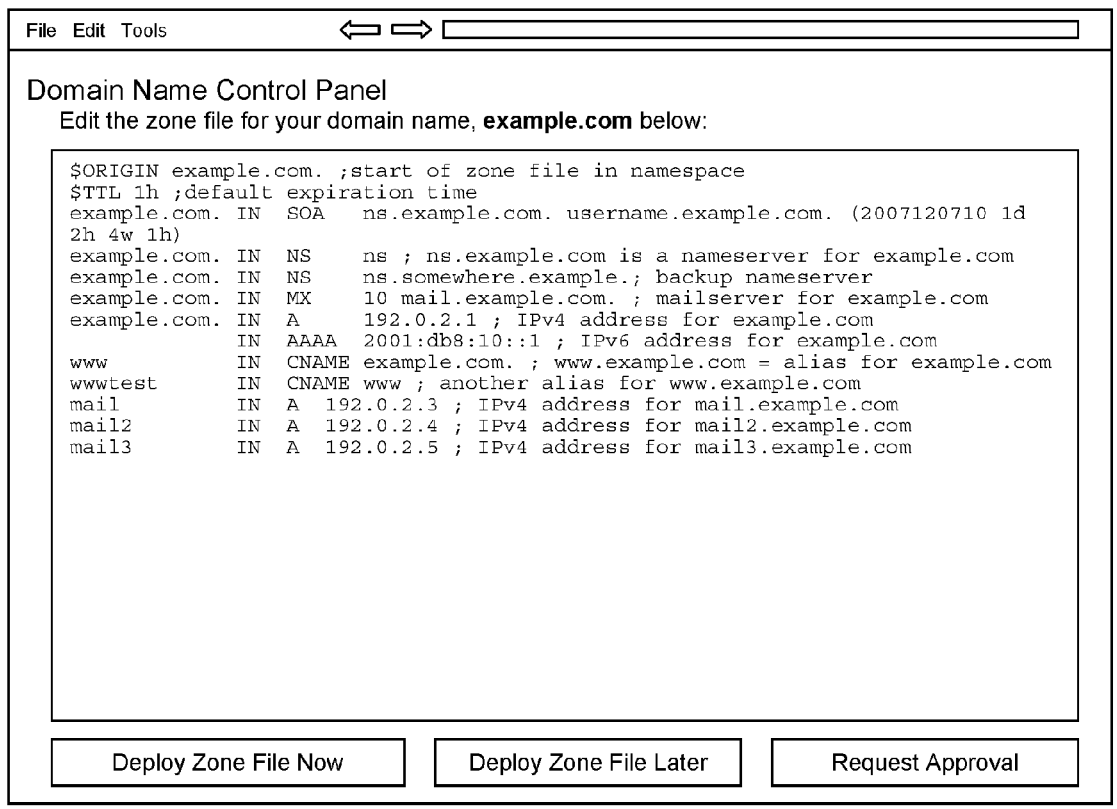
FIG. 1 is an example embodiment including a user interface demonstrating a zone file.
Figure 3:
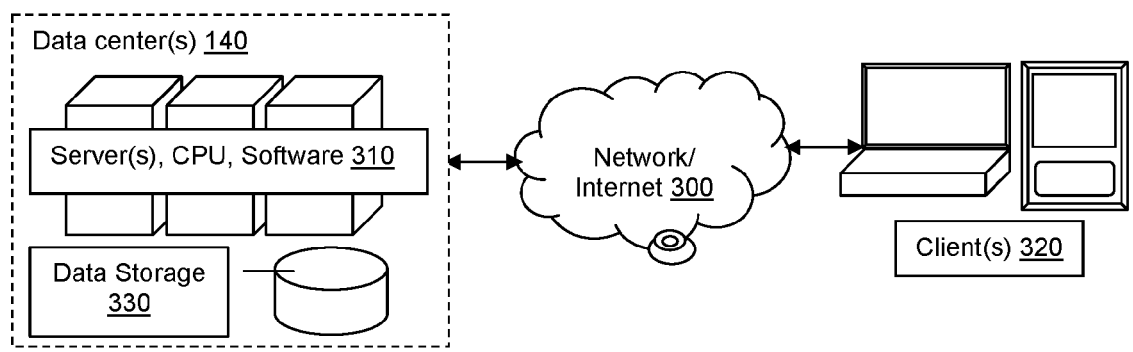
FIG. 3 illustrates a possible system for registering a tertiary domain name with revenue sharing and registrant controls.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

The Domain Name System (DNS) is the world's largest distributed computing system that enables access to any resource in the Internet by translating user-friendly domain names to IP Addresses. The Internet maintains two principal namespaces: the domain name hierarchy and the IP address system. The DNS maintains the domain namespace and provides translation services between these two namespaces.

The process of translating domain names to IP Addresses is called name resolution. A DNS name resolution is the first step in the majority of Internet transactions. This DNS provides name resolution service through a family of servers called domain name servers. The DNS resolution takes place transparently in response to a sent resolution request within applications such as web browsers, e-mail clients, and other Internet applications residing in a local operating system. These applications handle the required communications.

The authoritative data needed for performing the name resolution service is controlled by a name server, which contains the information for the zone for the domain name. In some instances, this information is contained in a file called the zone file. A zone file for the domain name example.com is seen in FIG. 1. The hierarchical domain space is divided into administrative units called zones, and a zone usually consists of a domain (e.g., example.com) and possibly one or more sub domains or other tertiary domain names (e.g., projects.example.com, services.example.com). As used in this specification, a domain name (e.g., example.com) may comprise a second level domain (SLD) concatenated to a top level domain (TLD), and a sub domain or tertiary domain may comprise any domains beyond the SLD (e.g., spreadsheet.example.com, columns.spreadsheet.example.com, etc.)

Sometimes sub domains are records in the zone, such as A records or CNAME records, and sometimes they are relegated to another name server. In the context of the current application, this is a significant distinction, as the registration of sub domains in the current application is accomplished via name server delegation of sub domains. For example, in the zone file for xyz.com, foo as a CNAME record or an A record simply defines a record of a type. However, foo in xyz.com as an NS record delegates the entire zone to a new name server.

Zone files may include a collection of DNS records such as resource records. A resource record is the basic data element in the DNS, and each resource record has a type, examples of which include address records (A, AAAA), name server records (NS), and mail exchanger records (MX) for a domain name. Each record may also include an expiration time limit, a class, and some type-specific data. Each record may also include various fields, such as NAME (a fully qualified domain name of the node in the hierarchy tree), TYPE (format of data for intended use, e.g., NS or MX servers), RDATA (e.g., IP addresses for address records), CLASS (e.g., IN for internet), etc. Resource records of the same type define a resource record set.

FIG. 2 shows a simplified example means for a user to register a domain name. In this example, a representative of the Chamber of Commerce for the city of Flagstaff desires to register the domain name flagstaff.com. This representative, now a potential domain name registrant, may access a web page of a domain name registrar, and search the availability of the desired domain name, flagstaff.com. The registrar web page may be a domain name control panel rendered by one or more servers operated by the registrar. These servers may transmit the rendered control panel to one or more client computers operated by the potential registrant. The client(s) may receive the rendered control panel and display it on a client display software, such as an Internet browser. This domain name control panel may include one or more user interface controls, such as HTML form elements, for receiving encoded data necessary for searching and/or requesting registration of a domain name. The domain name registrant may then transmit the domain name registration data to the registrar server(s).

The registrar's server(s) may search and determine the availability of the requested domain name, possibly by searching registrar/registry database records and/or zone files in the registry to determine the availability of the desired top level domain. If the requested domain is not found in the database records or zone files, and therefore not available, the registrar server(s) may transmit a notification to the client that the requested domain name is not available and the potential registrant may restart the process, entering a different domain name in the search field. However, if the requested domain name is available, the registrar server(s) may transmit a notification that the requested domain name is available and that the potential registrant should proceed with the registration process.

In the example in FIG. 2, on learning that flagstaff.com is available, the potential registrant may input a plurality of data into the control panel, possibly including registration information (e.g., registrant name and contact information, such as email, to be stored in a WHOIS database), pay a fee and receive notice that the domain name has been registered.

The registrar may then pay any required fees, update the WHOIS database, and follow any additional requirements of the registry or any additional authorities such as ICANN, to register the domain name. The registrar may then create a zone file for the registered domain name, and update the registry with the name server for the newly created zone file.

The disclosed invention improves on the current domain name registration model by providing means for the domain name registrant to sub register sub domains to a sub domain registrant, utilizing a registrar's framework to automatically update the existing DNS framework and the registrar's existing proprietary data. As non-limiting examples, this automatic update may include inserting an A record identifying an IP address for the sub domain, into the zone file for the domain name. Alternatively, the automatic update may include generating an entirely new zone file for the sub domain defining the DNS provider of the sub domain, possibly including an A record identifying the IP address for the sub domain. The automatic update may also include inserting an NS record into the zone file for the domain name, identifying the DNS provider for the sub domain via the newly created sub domain zone file. The automatic update may also include the registrar updating data records to track the sub domain registrations in association with the registered domain name.

The disclosed invention also improves on the current domain name registration model by creating a revenue sharing business model, allowing a domain name registrant to monetize their domain name. In this revenue sharing business model, the registrar may require certain fixed costs to execute the automatic framework to sub register sub domains, as described above. The registrar may identify these fixed costs, and require a fee to cover these costs from the domain name registrant for each sub domain registration transaction. However, the registrar may also provide means for the domain name registrant, possibly via user input through a sub domain registration settings control panel, to identify a registrant-defined fee associated with each sub domain registration. The registrar may then include a profit margin, within that fee, that the registrant will receive as each sub domain is registered.

For example, a domain name registrant, an Arizona Cardinals fan, may register the domain name cardinalfan.com. The registrant may then set up any desired sub domains to be used within the domain name for the registrant's purposes (e.g., admin.cardinalfan.com, stats.cardinalfan.com). The registrant may then desire to monetize the domain name by charging a fee above the registrar's fixed costs to register sub domains to other Cardinals fans, such as arnold.cardinalfan.com, andrew.cardinalfan.com or redandwhite.cardinalfan.com. However, the registrar may not want to deal with the recordkeeping or administration of DNS settings, database records, keeping track of fees for registering the sub domains, etc. The disclosed invention, therefore, provides means for a registrar to administrate all DNS settings, record keeping, and fee management for such a domain name registrant while providing a revenue sharing model with the registrant.

The disclosed invention also improves on the current domain name registration model by providing means, possibly through a sub domain registration settings control panel, for the domain name registrant to define one or more rules and/or prerequisites that must be fulfilled before a sub domain registrant is qualified to register the sub domain. Continuing the example of the Flagstaff Chamber of Commerce above, the Chamber of Commerce may want to promote the city through a .com website, but may not want businesses outside of the Flagstaff city limits to register these sub domains. For example, the Chamber of Commerce may want to promote Flagstaff businesses by encouraging these businesses to register sub domains such as joespizza.flagstaff.com, drugstore.flagstaff.com, etc. The city, in this example, may therefore provide these businesses with a code enabling them to register sub domains. In this example, the city may provide an alphanumeric code to businesses within the city limits, which the business representative will input into, for example, a sub domain registration control panel, in order to validate the business representative in order to register a sub domain.

The disclosed invention also improves on the current domain name registration model by providing means for the domain name registrant to define one or more features on, for example, a sub domain settings control panel made available to the sub domain registrant after registering the sub domain. For example, the Chamber of Commerce may have security concerns about providing sub domain registrants with the ability to create sub domain email addresses (e.g., phishing scams succeeding due to confusion with the flagstaff.com domain name) or about providing sub domain registrants access to the domain name or sub domain zone files (e.g., as a possible avenue for hackers.). The city may therefore define, possibly through a sub domain registration settings control panel, limitations on the features available to sub domain registrants in association with their registered sub domains.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 310 and/or client 320, and executing instructions stored (perhaps as scripts and/or software, possibly as software modules/components) in computer-readable media accessible to the CPU, such as a hard disk drive on a server 310 and/or client 320. The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 300 and should not limit possible network configuration or connectivity. Such a network 300 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks. At least one server 310 and at least one client 320 may be communicatively coupled to the network 300 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Server(s) 310 may comprise any computer or program that provides services to other computers, programs, or users either in the same computer or over a computer network 300. As non-limiting examples, the server 310 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 320.

The server 310 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 320 may be any computer or program that provides services to other computers, programs, or users either in the same computer or over a computer network 300. As non-limiting examples, the client 320 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 320. Non limiting example programming environments for client applications may include JavaScript/AJAX (client side automation), ASP, JSP, Ruby on Rails, Python's Django, PHP, HTML pages or rich media like Flash, Flex or Silverlight. The client(s) 320 that may be used to connect to the network 300 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 320 or the server(s) 310 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

Data storage 330 may be communicatively coupled to the network 300 and may include any information requested or required by the system and/or described herein. The data storage 330 may be any computer components, devices, and/or recording media that may retain digital data used for computing for some interval of time. The storage may be capable of retaining stored content for any data required, on a single machine or in a cluster of computers over the network 300, in separate memory areas of the same machine such as different hard drives, or in separate partitions within the same hard drive, such as a database partition. Structurally, the data storage 330 may comprise any collection of data. As non-limiting examples, the data storage 330 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

Non-limiting examples of the data storage 330 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

The server(s) 310 or software modules within the server(s) 310 may use query languages such as MSSQL or MySQL to retrieve the content from the data storage 330. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 310. As non-limiting examples of such software, the paragraphs below describe in detail the software modules/components that make up the software combination. These software modules/components may comprise software and/or scripts containing instructions that, when executed by a microprocessor on a server 310 or client 320, cause the microprocessor to accomplish the purpose of the module/component as described in detail herein. The software combination may also share information, including data from data sources and/or variables used in various algorithms executed on the servers 310 and/or clients 320 within the system, between each module/component of the software combination as needed.

A data center 340 may provide hosting services for the software combination, or any related hosted website including, but not limited to hosting one or more computers or servers in a data center 340 as well as providing the general infrastructure necessary to offer hosting services to Internet users including hardware, software, Internet web sites, hosting servers, and electronic communication means necessary to connect multiple computers and/or servers to the Internet or any other network 300.

Server(s) 310 may be hosted by any entity, possibly a hosting provider, a domain name registrar, a website development company, any other software service provider or any combination thereof. To manage users of such a system, including individuals or organizations, server(s) 310 may host and run a user administration program such as GODADDY's MY ACCOUNT control panel for management of hosting and domain names, as a non-limiting example. In such an administration control panel program, or admin, each user may be assigned a user id. This user id may identify transactions performed by each user. These transactions may be stored as data records in data storage

330, each data record including the user id to associate the user with the transaction in data storage 330.

Figure 4:
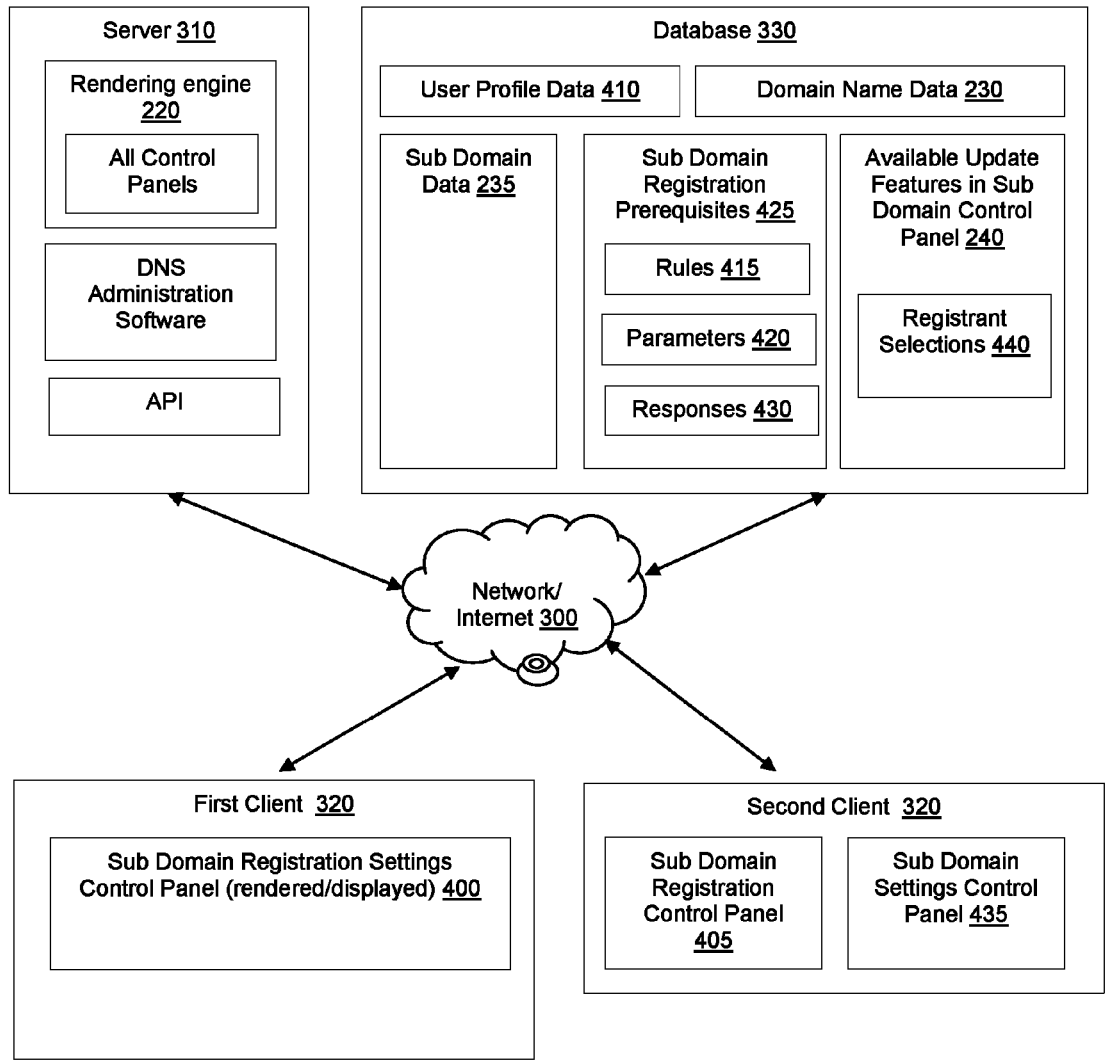
FIG. 4 illustrates a more detailed possible system for registering a tertiary domain name with revenue sharing and registrant controls.

FIG. 4 shows a more detailed example embodiment of an environment for the systems, and for accomplishing the method steps, disclosed herein. As non-limiting examples, all disclosed software modules may run on one or more server(s) 310 and may include one or more user interfaces generated by the server(s) 310 and transmitted to and displayed on the client(s) 320. The user interface(s) may be configured to receive input from the user and transmit this input to the server(s) 310 for the administration and execution of the software, using data in data storage 330 associated with the software modules. Thus, the disclosed system may be configured to execute any or all of the method steps disclosed herein.

The systems and methods disclosed in FIGS. 4-10 may provide means for a domain name registrant to register sub domains to a sub domain registrant, and to automatically update the existing DNS framework and the registrar's existing proprietary data and framework accordingly. Server(s) 310 may render the sub domain registration settings control panel 400, such as that seen in FIG. 5, and transmit it to client(s) 320, which may display it on an Internet browser. The sub domain registration settings control panel 400 may comprise a plurality of, and any combination of, HTML form elements (e.g., checkbox, slider, radio button, drop down box, text box, text area, etc.) In the example embodiment in FIG. 5, the registrant has registered the domain name flagstaff.com using any of the registration techniques described herein.

Figure 5:
FIG. 5 is an example embodiment including a user interface used in registering a tertiary domain name with revenue sharing and registrant controls.

The sub domain registration settings control panel 400 seen in FIG. 5 includes means for the registrant to define each of: the revenue sharing business model; one or more rules and/or prerequisites that must be fulfilled before a sub domain registrant is qualified to register the sub domain; and one or more features on, for example, a sub domain settings control panel made available to the sub domain registrant after registering the sub domain. However, in different embodiments, each of these features may appear on separate control panels, or any combination of these features may appear on a separate control panel.

Figure 6:
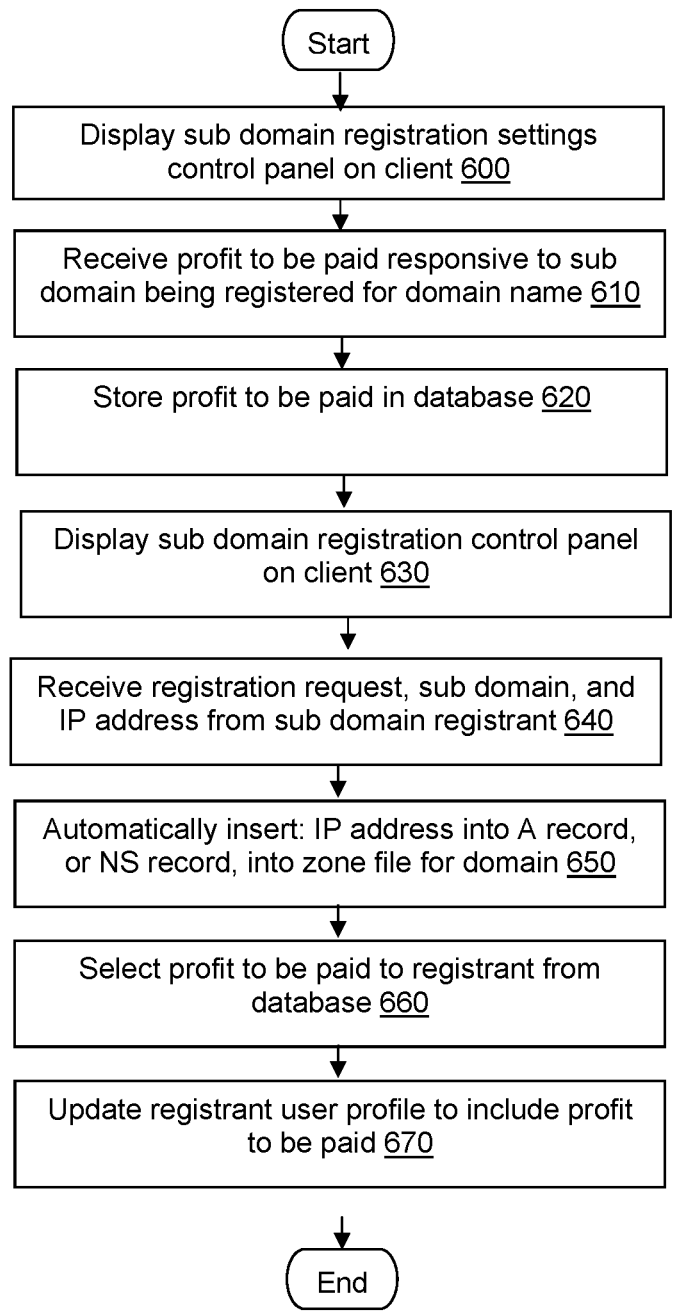
FIG. 6 is a flow diagram illustrating a possible embodiment of a method for registering a tertiary domain name with revenue sharing and registrant controls.

The systems and methods disclosed in FIGS. 4, 5 and 6 also provide means to create a revenue sharing business model, allowing a domain name registrant to monetize their domain name. In this revenue sharing business model, the registrar may require certain fixed costs to execute the automatic framework used to sub register sub domains as described above. The registrar may identify these fixed costs, and require them from the domain name registrant for each sub domain registration transaction. However, the registrar may also provide means for the domain name registrant, possibly via user input through a sub domain registration settings control panel 400, to identify a registrant-defined fee associated with each sub domain registration. The registrar may then include a profit margin, within that fee, that the registrant will receive as each sub domain is registered.

Multiple business models may be used to accomplish the monetization of the domain name through sub domain registration. For example, a domain name registrar may follow any of the disclosed registration procedures to register a domain name in the name of the registrar. The registrar may then sub register sub domains associated with the registered domain name to a plurality of sub domain registrants, and charge each of the sub domain registrants a fee. Any difference between the fee charged and the operating costs may represent a profit to the registrar.

In another, revenue sharing, business model to monetize the domain name, a domain name registrant, possibly a customer of the registrar, may follow any of the disclosed registration procedures to register a domain name. Under the revenue sharing model, the registrar may provide the registrant with a sub domain registration settings control panel 400, such as that seen in FIG. 5, to define the amount charged to sub domain registrants. The difference between the amount the registrant charges and the amount required by the registrar for fixed costs represents the profit margin available to the registrant from the revenue share.

The content for the sub domain registration settings control panel 400 may display the required registrar costs (e.g., for each sub domain registered, a fee of $1.00 will be charged to the account associated with the registered domain name). In some embodiments, the domain name registrant may desire to not charge the sub domain registrants. In these embodiments, the displayed fee for each registered sub domain will be charged to a user profile account for the registrant. Continuing the example above, the Flagstaff Chamber of Commerce may want to promote the town without charging local businesses to register sub domains. In this case, the registrant may opt out of the revenue sharing business model. In the example control panel in FIG. 5, this may be accomplished by selecting the checkbox to charge the registrar's fixed costs to a Flagstaff Chamber of Commerce user profile account. By selecting this checkbox, or in some embodiments, by not entering the desired profit margin, the registrant may indicate their intent to pay a fee covering the registrar costs.

The sub domain registration settings control panel 400 may also include an HTML form element allowing the registrant to specify a desired profit margin comprising the amount over the required registrar costs that the registrant wants to receive in the revenue sharing model. On submission of the HTML form data and transmission from client(s) 320 to server(s) 310, server(s) 310 may execute a database query inserting or updating a Boolean value (e.g., true or false) in a data record associated with the registrant and/or domain name, indicating the registrant's intent, or lack thereof, to participate in the revenue sharing model. In those embodiments where the registrant selects to participate, the server may include within the query (or run an additional query to insert) the amount of the profit margin the registrant wants to receive in the revenue sharing model.

FIG. 6 shows a flow diagram illustrating the method steps for establishing the revenue sharing program. In step 600, server(s) 310 render a sub domain registration settings control panel 400 comprising a first HTML form and transmit the sub domain registration settings control panel 400, through the network 300, to a first client computer 320 for display on a first Internet browser running on the first client computer 320. In step 610, server(s) 310 receive, from a registrant of a domain name, via the first HTML form, a profit to be paid in response to a sub domain being registered in association with the domain name. In step 620, server(s) 310 execute a database query storing, within a database 330 coupled to the network 300, the profit to be paid. In step 630, server(s) 310 render a sub domain registration control panel 405 comprising a second HTML form and transmit the sub domain registration control panel 405, through the network 300, to a second client computer 320 for display on a second Internet browser running on the second client computer 320. In step 640, server(s) 310 receive, from a sub domain registrant via the second HTML form, a transmission encoding: a sub domain registration request; the sub domain to be registered in association with the domain name; and an IP address to which a DNS directs an HTTP request for the sub domain. In step 650, server(s) 310 execute an automated DNS command inserting: the IP address into an address record within a zone file for the domain name; or a name server record within the zone file for the domain name. In step 660, server(s) 310 execute a database query selecting the profit to be paid. In step 670, server(s) 310 execute a database query storing, within a user profile record 410 associated with the registrant, the profit to be paid.

In some embodiments, described in more detail below, the sub domain registration settings control panel 400 may include one or more HTML form elements representing prerequisites required by the registrar before the registrant is able to register sub domains and/or affect any updates to the sub domain registration settings in the sub domain registration settings control panel 400. As a non-limiting example, because each of the registered sub domains depends on the domain name being actively registered and maintained, surrender of the domain name by the registrant could have catastrophic consequences on the sub domain registrants.

The registrar may therefore provide a service ensuring stability in the registered domain name, wherein, if the domain name registrant surrenders the domain name (e.g., by not paying fees, attempting to transfer the domain name, changing contact data in WHOIS records, etc.), server(s) 310 may determine if the domain name is currently registered to the registrant. If not, server(s) 310 may automatically generate and execute commands to update the domain name account and any related records and administration (e.g., registry records, registrant records, WHOIS information, zone files, DNS records, etc.) to transfer the domain name to the registrar. The sub domain registration settings control panel 400 may therefore include one or more HTML form elements requiring the registrant to agree to the transfer of the domain name in the event of a domain name surrender before the registrant is allowed to make changes within the control panel 400, and/or prior to sub domains being registered in association with the domain name.

On submission of the HTML form data and transmission from client(s) 320 to server(s) 110, server(s) 310 may execute a database query inserting or updating a Boolean value (e.g., true or false) in a data record associated with the registrant and/or domain name, indicating the registrant's, confirmation, or lack thereof, to automatically transfer the domain name from the registrant to the registrar if the registrant no longer administrates the domain name. In embodiments where this confirmation is received (i.e., server(s) 310 query a database and confirm a true value associated in the database with the registrant and/or domain name), server(s) 310 may monitor domain name related data (e.g., WHOIS records, registrar billing records, registrar domain name data records, etc.) to determine if the domain name is currently registered to the registrant. If not, server(s) 310 may automatically generate and execute commands to automatically transfer the domain name account and any related records and administration (e.g., registry records, registrant records, WHOIS information, DNS records, zone files, etc.) to reflect the registrar as the new registrant of the domain name.

Figure 7:
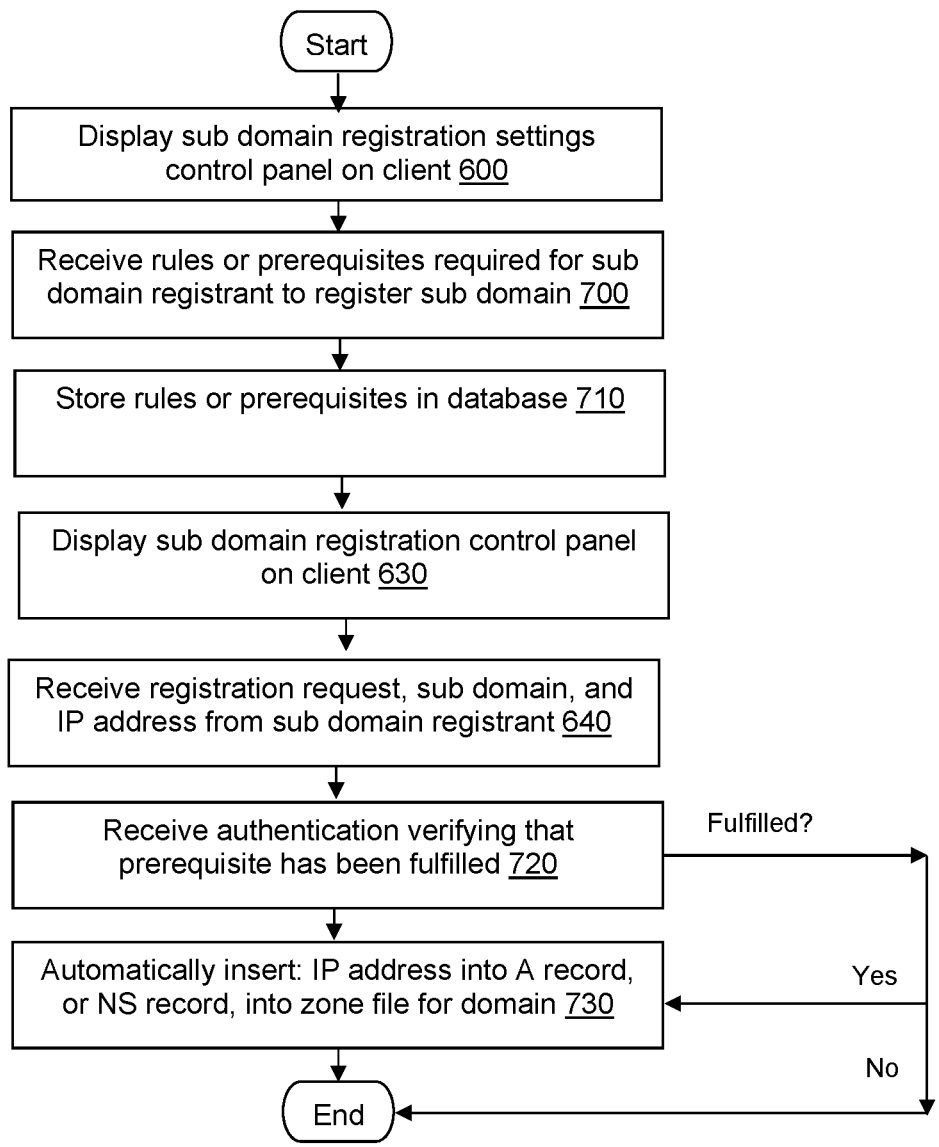
FIG. 7 is a flow diagram illustrating a possible embodiment of a method for registering a tertiary domain name with revenue sharing and registrant controls.

The systems and methods disclosed in FIGS. 4, 5 and 7 also provide means, possibly through sub domain registration settings control panel 400, for the domain name registrant to define one or more rules 420, the parameters of these rules 425 and/or one or more prerequisites 425 that must be fulfilled before a sub domain registrant is qualified to register the sub domain. The sub domain registration settings control panel 400 may include any combination of HTML form elements allowing the registrant to define the rules 415 and/or rule parameters 420 associated with the one or more prerequisites 425 required of a sub domain registrant before they are enabled to register a sub domain related to the domain name.

The example embodiment in FIG. 5 reflects the example above, where the Flagstaff Chamber of Commerce wants to limit sub domain registrations only to businesses within the Flagstaff city limits. The Chamber of Commerce may therefore provide these businesses with an alphanumeric code, possibly via SMS message, email, postcard, phone call, etc. The registrant may therefore select the rules 415 and/or rule parameters 420 associated with prerequisites 425 required by the sub domain registrant prior to registering a sub domain name. On submission of the HTML form data and transmission from client(s) 320 to server(s) 110, server(s) 310 may execute a database query inserting, for each of the defined rules 415, parameters 420, and/or prerequisites 425, a data record, associated with the domain name and/or registrant, into a database table defining the prerequisites.

The rules 415, parameters 420 and/or prerequisites 425 may be predetermined and offered to the registrant, as seen in FIG. 5, or may be defined by the registrant according to registrant-specific customizations (not shown). For example, the sub domain registration settings control panel may have a collection of pre-defined parameters 420, stored in database 330, that a user may select from to define the rules 415 verifying the registrant for sub domain registration. In some of these embodiments, the parameters 420 may be even more fine tuned, so that server(s) 310 may determine if the registrant is authenticated to register a sub domain.

Continuing the example above, the Flagstaff Chamber of Commerce, in addition to requiring a provided code, may also want to ensure that the user has a valid email address to which the Chamber of Commerce may send notifications, etc. The rules 415 may therefore be defined with parameters 420 requiring each potential sub domain registrant to provide a valid email address as a prerequisite 420 to registering the desired sub domain. The rules 415 may include additional parameters 420 to ensure that the email address is a valid email address (e.g., determining whether the email contains '@,' '.,' a valid domain name, etc.).

In some embodiments, the rules 415 and or parameters 420 may be customized via customized computer code, via executable files, scripts, browser plug-ins, application programming interfaces (API), etc. Provided by the registrant. Continuing the example above, the Chamber of Commerce may desire that the potential sub domain registrant upload a scanned copy of their business license to prove that their business is within the Flagstaff city limits. The registrant in this instance may provide custom software programming, or software instructions to access an API, to define the rules 415 and the customized parameters 420 required as prerequisites 425 for sub domain registration. These may be stored in data storage 330.

FIG. 7 shows a flow diagram illustrating the method steps for authenticating a potential sub domain registrant according to the rules 415, rule parameters 420, and/or prerequisites 425 to register a sub domain. In step 600, server(s) 310 render a sub domain registration settings control panel 400 comprising a first HTML form, and transmit the sub domain registration settings control panel 400, through the network 300, to a first client computer 320 for display on a first Internet browser running on the first client computer 320. In step 700, server(s) 310 receive, from a registrant of a domain name, via the HTML form, at least one user data defining at least one rule or prerequisite that must be fulfilled prior to a sub domain registrant being qualified to register the sub domain. In step 710, server(s) 310 execute a database query storing, within a database coupled to the network, the at least one user data defining the at least one rule or prerequisite. In step 630, server(s) 310 render a sub domain registration control panel comprising a second HTML form and transmit the sub domain registration control panel 405, through the network 300, to a second client computer 320 for display on a second Internet browser running on the second client computer 320. In step 640, server(s) 310 receive, from a sub domain registrant via the second HTML form, a transmission encoding: a sub domain registration request; the sub domain to be registered in association with the domain name; and an IP address to which a DNS directs an HTTP request for the sub domain. In step 720, server(s) 310 receive, from a sub domain registrant via the second HTML form, a transmission encoding an authentication verifying that the prerequisite 425 has been fulfilled. In step 730, responsive to receiving the authentication, server(s) 310 execute an automated DNS command inserting the IP address into an address record within a zone file for the domain name; or a name server record within the zone file for the domain name.

In some embodiments, the authentication verifying that the prerequisite 425 has been fulfilled may be in the form of a challenge presented to the potential sub domain registrant. In these embodiments, server(s) 310 may generate a challenge, such as a request for a code, valid email, uploaded document, challenge question, CAPTCHA, etc. and transmit it to client(s) 320 for display. The sub domain registration control panel 400, or other client display interface, may receive the response to the challenge, and transmit it to server(s) 310, which may compare the response to a valid response 430 stored in data storage 330.

If the user response matches the valid response 430 in data storage, and is otherwise valid according to the rules 415, server(s) 310 may proceed with the sub domain registration as disclosed herein. If the response is not valid, server(s) 310 may generate a notification that the response is not valid, and transmit it to client(s) 320 for display, possibly including an additional challenge.

The systems and methods disclosed in FIGS. 4, 5, 8 and 10 also provide means, possibly through sub domain registration settings control panel 400, for the domain name registrant to define one or more features made available to the sub domain registrant, possibly on a sub domain settings control panel 435, after registering the sub domain. The sub domain registration settings control panel 400 may include any combination of HTML form elements allowing the registrant to select or deselect features of registered sub domains that are available to sub domain registrants via the sub domain settings control panel 435.

The example embodiment in FIG. 5 reflects the example above, where the Flagstaff Chamber of Commerce wants, for security reasons, to limit the sub domain features available to the sub domain registrant. In some embodiments, these features are limited by controlling the HTML form elements displayed on a sub domain settings control panel 435. As seen in FIG. 5, the registrant may select which HTML form elements will be displayed on the sub domain settings control panel 435, and by extension, which sub domain settings will be available to the sub domain registrant for update. On submission of the HTML form data and transmission from client(s) 320 to server(s) 110, server(s) 310 may execute a database query inserting, for each of the registrant selections 440, associated with the domain name and/or registrant, into a database table defining the available update features in the sub domain control panel 435. In some embodiments, the registrant selections 440 may be stored as Boolean value (e.g., true or false), which may reflect which update features will be made available to the sub domain registrants.

Figure 8:
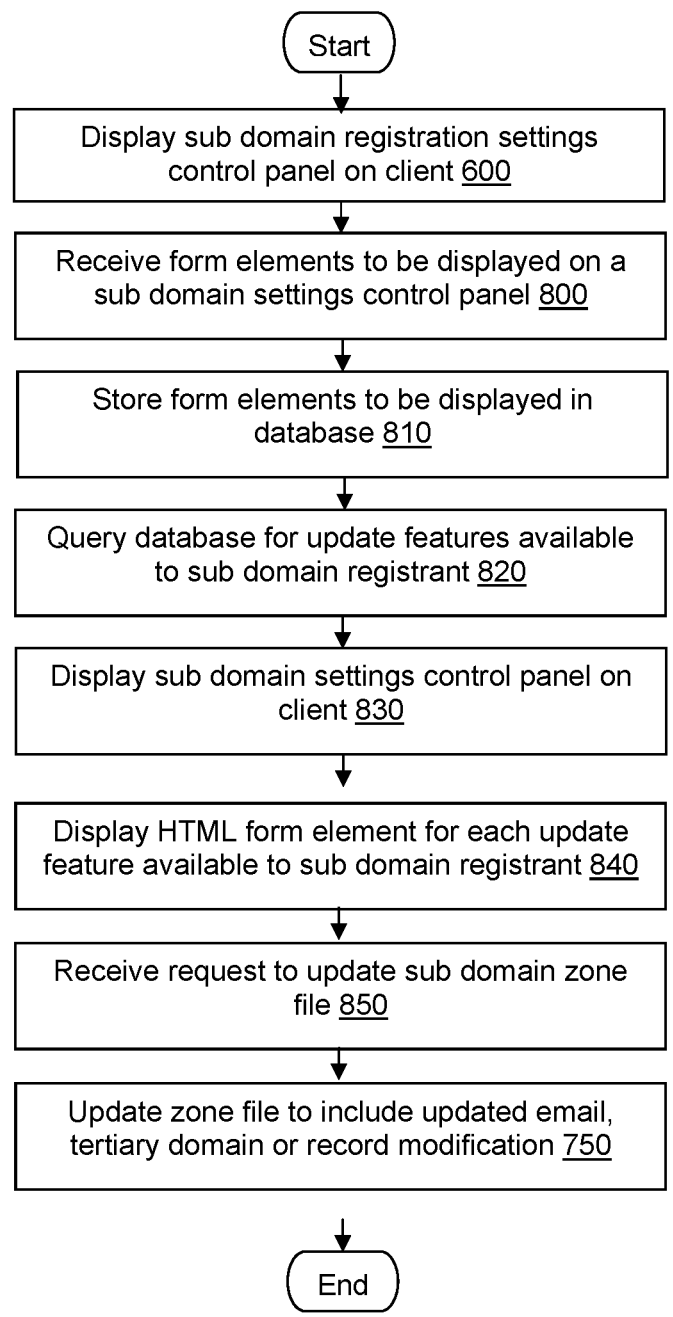
FIG. 8 is a flow diagram illustrating a possible embodiment of a method for registering a tertiary domain name with revenue sharing and registrant controls.

FIG. 8 shows a flow diagram illustrating the method steps for determining and applying the update features available to the sub domain registrant via a sub domain control panel 435. In step 600, server(s) 310 render a sub domain registration settings control panel 400 comprising a first HTML form and transmit the sub domain registration settings control panel 400, through the network 300, to a first client computer 320 for display on a first Internet browser running on the first client computer 320. In step 800, server(s) 310 receive, from a registrant of a domain name, via the HTML form, at least one form element 440 to be displayed on a second HTML form on a sub domain setting control panel 435, the at least one form element representing a sub domain update feature available to a sub domain registrant. In step 810, server(s) 310 execute a database query storing, within a database 330 coupled to the network 300, the at least one sub domain update feature available to the sub domain registrant. In step 820, server(s) 310 execute a database query selecting the at least one sub domain update feature 440 available to sub domain registrant. In steps 830 and 840, server(s) 310 render the sub domain settings control panel 435 comprising the second HTML form and the at least one HTML form element for each sub domain update feature available 440 to the sub domain registrant, and transmit the sub domain settings control panel 435, through the network 300, to a second client computer 320 for display on a second Internet browser running on the second client computer 320. In step 850, server(s) 310 receive, from a sub domain registrant via the second HTML form, a transmission encoding: a sub domain zone file update request; and an email address, a tertiary domain, or a DNS record modification to be updated within a sub domain zone file. In step 860, server(s) 310 execute an automated DNS command updating the zone file to include the email address, the tertiary domain or the DNS record modification.

After receiving and storing all sub domain registration settings received by the registrant from the sub domain registration settings control panel 400, server(s) 310 may receive a request from a potential sub domain name registrar, via client(s) 320, to search the availability of, and/or register, a sub domain associated with the domain name.

In some embodiments, this request may comprise an HTTP request received from client(s) 320 via a hypertext link within the content of a web page within a website. In some embodiments, the website may be a registrar website, and in some embodiments, the website may be a website operated by the registrant associated with the sub domain's domain name. In some embodiments, the sub domain registration control panel may comprise a web page created by the registrar or registrant. In other embodiments, the sub domain registration control panel may be rendered by on registrant websites via remote procedure call to an API on the registrar's server, the remote procedure call causing the server to render, and the registrant's web page to display the The website may include a web page specifically programmed with the disclosed sub domain registration control panel 405 functionality. In response to the HTTP request, server(s) 310 may render the sub domain registration control panel 405 and transmit it to client(s) 320, which may display it on an Internet browser or other client display software.

FIG. 9, for example, demonstrates a sub domain registration control panel 405, which may comprise a plurality of HTML form elements.

In some embodiments, prior to rendering the sub domain registration control panel 405 (or possibly the link requesting sub domain registration on the website), server(s) 310 may execute a database query returning one or more data records associated with the domain name and/or registrant to determine if the registrant selected the HTML form element agreeing to transfer the domain name to the registrar if the domain name is surrendered by the registrant. If not, the process may end without rendering the sub domain registration control panel 405. In some embodiments, server(s) 310 may transmit a notification to the registrant with the reasons the control panel 405 wasn't rendered.

The sub domain registration control panel 405 may include any combination of HTML form elements allowing the registrant to input a sub domain or any other tertiary domain to be searched and/or registered in association with the domain name. On submission of the HTML form data and transmission from client(s) 320 to server(s) 110, server(s) 310 may execute a query of the zone file for the domain name, or any related DNS files, to identify the requested sub domain within the zone file or DNS files (e.g., in A records or NS records). In some embodiments, as each sub domain is registered, server(s) 310 may execute a database query to insert a record into a database of registered sub domains. In these embodiments, on submission of the HTML form data and transmission from client(s) 320 to server(s) 110, server(s) 310 may execute a database query for any records containing data for the requested sub domain.

If the query identifies the sub domain within the zone file or related DNS file, or if the database query returns at least one record containing data for the requested sub domain, server(s) 310 may determine that the sub domain is unavailable, and may render and transmit a notice that the domain name is not available, which may be displayed on the sub domain registration control panel 405. The potential sub domain registrant may then input another desired domain name and repeat the process.

If the query does not identify the sub domain within the zone file or related DNS file, or if the database query does not return at least one record containing data for the requested sub domain, server(s) 310 may determine that the sub domain is available, and may render and transmit a notice that the domain name is available, which may be displayed on the sub domain registration control panel 405.

After determining that the desired sub domain is available, the potential sub domain registrant may input additional information about the domain name, such as DNS data identifying an IP address of a server to which an NS record within the domain name zone file, or an A record within a newly generated SLD zone file, as described below, should redirect in response to an HTTP request for the sub domain. The sub domain registration control panel 405 may include any combination of HTML form elements allowing the registrant to input this DNS data.

On submission of the HTML form data and transmission from client(s) 320 to server(s) 110, server(s) 310 may authenticate the user according to any prerequisites, as described herein, and may execute any necessary database queries to update any proprietary registrar's data records in the registrar database 330.

Server(s) 310 may then create a DNS structure for the registered sub domain. The DNS structure may be created in one of a plurality of ways. In one embodiment, server(s) 310 may create an A record, within the zone file for the associated domain name, that responds to incoming HTTP requests for the sub domain by directing the HTTP request to the IP address for a website reflected in the A record. The DNS may then redirect these requests to the appropriate IP address and website.

In another embodiment, server(s) 310 may automatically generate a sub domain zone file (which defines the DNS provider for the sub domain rather than returning an A record) including an A record within the sub domain zone file that responds to incoming HTTP requests for the sub domain by directing the HTTP request to the IP address for a website reflected in the A record. The DNS may then redirect these requests to the appropriate IP address and website. The server(s) 310 may then update an NS record within the zone file for the associated domain name, so that DNS responds to incoming HTTP requests for the sub domain by referencing the NS record (rather than returning an A record in the domain name zone file), handling the redirection to the sub domain zone file, and directing the HTTP request to the IP address within the sub domain zone file for a website reflected in a sub domain zone file's A record. The DNS may then redirect these requests to the appropriate IP address and website.

Figure 10:
FIG. 10 is a example embodiment including a user interface used in registering a tertiary domain name with revenue sharing and registrant controls.

FIG. 10 demonstrates a sub domain settings control panel 435, which may be available to the sub domain registrant after registering the sub domain. In some embodiments, as server(s) 310 render the sub domain control panel 435, the HTML form elements may be displayed or not according to the data records within the data table defining features available to the sub domain registrant according to the registrar selections 440 from the sub domain registration settings control panel 400. Server(s) 310 may receive selections from the sub domain settings control panel 435, and update registrar data records and/or DNS records to reflect additional email, additional tertiary domains or update DNS settings in the sub domain zone file.

The steps included in the embodiments illustrated and described in relation to FIGS. 1-10 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:
1. A system comprising:
 a first client computer coupled to a network and running a first Internet browser displaying a first hypertext markup language (HTML) form on a sub domain registration settings control panel;

a second client computer coupled to the network and running a second Internet browser displaying a second HTML form on a sub domain registration control panel; and a server computer coupled to the network and comprising at least one processor executing computer executable instructions within a memory causing the server computer to:
  render the sub domain registration settings control panel;
  transmit the sub domain registration settings control panel, through the network, to a first client computer for display on the first Internet browser;
  receive, from a registrant of a domain name, via the first HTML form, at least one user data defining at least one rule or prerequisite that must be fulfilled prior to a sub domain registrant being qualified to register a sub domain, wherein the at least one rule or prerequisite includes the registrant transmitting an alphanumeric code to the sub domain registrant via an SMS message, an email, a postcard or a phone call;
  execute a database query storing, within a database coupled to the network, the at least one user data defining the at least one rule or prerequisite;
  render the sub domain registration control panel;
  transmit the sub domain registration control panel, through the network, to the second client computer for display on the second Internet browser;
  receive, from a sub domain registrant, via the second HTML form, a transmission encoding:
    a sub domain registration request;
    the sub domain to be registered in association with the domain name;
    an Internet protocol (IP) address to which a domain name system (DNS) directs a hypertext transfer protocol (HTTP) request for the sub domain; and
    an authentication verifying that the at least one rule or prerequisite has been fulfilled, the authentication comprising:
      the alphanumeric code; and
      an email address verified by the server computer;
  responsive to receiving the authentication, execute an automated DNS command inserting:
    the IP address into an address record within a zone file for the domain name; or
    a name server record within the zone file for the domain name.

2. The system of claim 1, wherein the at least one user data comprises at least one parameter defining the at least one rule or prerequisite.

3. The system of claim 1, wherein the at least one user data comprises:
  at least one pre-defined parameter for the at least one rule or prerequisite:
    defined within at least one data record in the database; and
    selected by the registrant from the first HTML form; or
  a customized software defining the at least one pre-defined parameter for the at least one rule or prerequisite.

4. The system of claim 1, wherein the instructions cause the server computer to:
  query the database for a data record comprising an authentication challenge;
  render the authentication challenge on the sub domain registration control panel;
  transmit the sub domain registration control panel to the second client computer for display;
  receive a challenge response to the authentication challenge via the second HTML form;
  compare the challenge response with a correct challenge response in the data record; and
  responsive to the challenge response matching the correct challenge response, authenticate that the at least one rule or prerequisite has been fulfilled.

5. The system of claim 1, wherein the instructions cause the server computer to receive from the registrant, via an HTML form element on the first HTML form, a selection acknowledging that, responsive to the domain name being surrendered by the registrant, the domain name will be transferred to a domain name registrar.

6. A system comprising a server computer coupled to a network and comprising at least one processor executing instructions within a memory causing the server computer to:
  render a first control panel comprising a first web page form;
  transmit the first control panel, through the network, to a first client computer for display on a first client display software running on the first client computer;
  receive, from a registrant of a domain name, via the first web page form, at least one user data defining at least one rule or prerequisite that must be fulfilled prior to a sub domain registrant being qualified to register a sub domain, wherein the at least one rule or prerequisite includes the registrant transmitting an alphanumeric code to the sub domain registrant via an SMS message, an email, a postcard or a phone call;
  execute a database query storing, within a database coupled to the network, the at least one user data defining the at least one rule or prerequisite;
  render a second control panel comprising a second web page form;
  transmit the second control panel, through the network, to a second client computer for display on a second client display software running on the second client computer;
  receive, from a sub domain registrant, via the second web page form, a transmission encoding:
    a sub domain registration request;
    the sub domain to be registered in association with the domain name;
    an Internet protocol (IP) address to which a domain name system (DNS) directs a hypertext transfer protocol (HTTP) request for the sub domain; and
    an authentication verifying that the at least one rule or prerequisite has been fulfilled, the authentication comprising:
      the alphanumeric code; and
      an email address verified by the server computer;
  responsive to receiving the authentication, execute an automated DNS command inserting:
    the IP address into an address record within a zone file for the domain name; or
    a name server record within the zone file for the domain name.

7. The system of claim 6, wherein the at least one user data comprises at least one parameter defining the at least one rule or prerequisite.

8. The system of claim 6, wherein the at least one user data comprises:
  at least one pre-defined parameter for the at least one rule or prerequisite:

defined within at least one data record in the database; and selected by the registrant from the first web page form; or a customized software defining the at least one pre-defined parameter for the at least one rule or prerequisite.

9. The system of claim 6, wherein the instructions cause the server computer to:

query the database for a data record comprising an authentication challenge;

render the authentication challenge on the second control panel;

transmit the second control panel to the second client computer for display;

receive a challenge response to the authentication challenge via the second web page form;

compare the challenge response with a correct challenge response in the data record; and responsive to the challenge response matching the correct challenge response, authenticate that the at least one rule or prerequisite has been fulfilled.

10. The system of claim 6, wherein the instructions cause the server computer to receive from the registrant, via a form element on the first web page form, a selection acknowledging that, responsive to the domain name being surrendered by the registrant, the domain name will be transferred to a domain name registrar.

11. A method comprising the steps of:

rendering, by a server computer coupled to a network, a first control panel comprising a first web page form;

transmitting, by the server computer, the first control panel, through the network, to a first client computer for display on a first client display software running on the first client computer;

receiving, by the server computer, from a registrant of a domain name, via the first web page form, at least one user data defining at least one rule or prerequisite that must be fulfilled prior to a sub domain registrant being qualified to register a sub domain, wherein the at least one rule or prerequisite includes the registrant transmitting an alphanumeric code to the sub domain registrant via an SMS message, an email, a postcard or a phone call;

executing, by the server computer, a database query storing, within a database coupled to the network, the at least one user data defining the at least one rule or prerequisite;

rendering, by the server computer, a second control panel comprising a second web page form;

transmitting, by the server computer, the second control panel, through the network, to a second client computer for display on a second client display software running on the second client computer;

receiving, by the server computer, from a sub domain registrant, via the second web page form, a transmission encoding:

a sub domain registration request;

the sub domain to be registered in association with the domain name;

an Internet protocol (IP) address to which a domain name system (DNS) directs a hypertext transfer protocol (HTTP) request for the sub domain; and an authentication verifying that the at least one rule or prerequisite has been fulfilled, the authentication comprising:

the alphanumeric code; and an email address verified by the server computer;

responsive to receiving the authentication, executing, by the server computer, an automated DNS command inserting:

the IP address into an address record within a zone file for the domain name; or a name server record within the zone file for the domain name.

12. The method of claim 11, wherein the at least one user data comprises at least one parameter defining the at least one rule or prerequisite.

13. The method of claim 11, wherein the at least one user data comprises:

at least one pre-defined parameter for the at least one rule or prerequisite:

defined within at least one data record in the database; and selected by the registrant from the first web page form; or a customized software defining the at least one pre-defined parameter for the at least one rule or prerequisite.

14. The method of claim 11, further comprising the steps of:

querying, by the server computer, the database for a data record comprising an authentication challenge;

rendering, by the server computer, the authentication challenge on the second control panel;

transmitting, by the server computer, the second control panel to the second client computer for display;

receiving, by the server computer, a challenge response to the authentication challenge via the second web page form;

comparing, by the server computer, the challenge response with a correct challenge response in the data record; and responsive to the challenge response matching the correct challenge response, authenticating, by the server computer, that the at least one rule or prerequisite has been fulfilled.

15. The method of claim 11, further comprising the step of receiving, by the server computer, from the registrant, via a form element on the first web page form, a selection acknowledging that, responsive to the domain name being surrendered by the registrant, the domain name will be transferred to a domain name registrar.

* * * * *